T. H. BRADY.
ADJUSTABLE INSULATED JOINT.
APPLICATION FILED FEB. 21, 1908.

916,414.

Patented Mar. 30, 1909.

WITNESSES:

INVENTOR.
Thomas H. Brady
BY
ATTORNEY.

UNITED STATES PATENT OFFICE.

THOMAS H. BRADY, OF NEW BRITAIN, CONNECTICUT.

ADJUSTABLE INSULATED JOINT.

No. 916,414.  Specification of Letters Patent.  Patented March 30, 1909.

Application filed February 21, 1908. Serial No. 417,051.

*To all whom it may concern:*

Be it known that I, THOMAS H. BRADY, a citizen of the United States, and a resident of New Britain, in the county of Hartford and State of Connecticut, have invented certain new and useful Improvements in Adjustable Insulated Joints, of which the following is a specification.

The object of the invention is to produce a device of the class specified having features of novelty and advantage.

Figure 1:
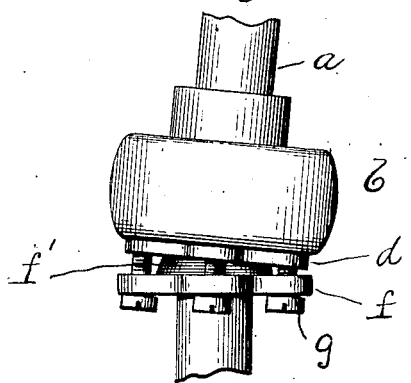
Figure 2:
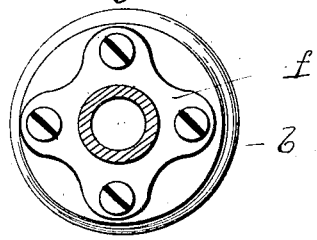
Figure 3:
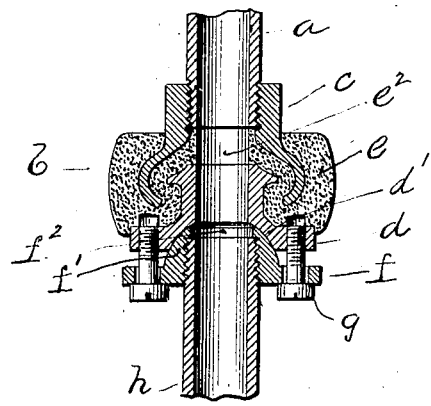

In the drawings—Figure 1 is a general side elevation of the device illustrating the adjusting feature. Fig. 2 is a bottom view of the same. Fig. 3 is a central vertical section.

The device is illustrated as used in connection with a combined gas and electric fixture. $a$ is the nipple on a main feed pipe; $b$ is the joint made up of the two parts $c$, $d$ embedded in, connected together, but insulated from each other by the body of insulating material $e$. The member $c$ is internally threaded in order that it may be screwed onto the nipple $a$. The member $d$, which is preferably of metal, has a depression $d'$ in its lower side.

$f$ is the fixture member which has a part $f'$, preferably of metal, adapted in size and shape to fit the depression $d'$ in the joint member $d$ so as to permit of the adjustment of the fixture member with reference to the joint $b$. As shown the fixture member has a flange through which screws $g$ pass and thread into the joint member $d$. There is a central passage $f^2$ through the fixture member $f$ which is internally threaded to receive a fixture, the stem of which is indicated at $h$.

It often happens that the nipples are bent out of line where they come through the wall and it is necessary to bring them into alinement, particularly when there are two or more fixtures, in order to preserve a uniform and sightly appearance. As these fixtures are usually gas and electric combined it is essential in alining them that a gas-tight joint be maintained. Also the adjustable device must be compact in order to be contained in the usual canopy which covers the joint. By my invention I provide a compact joint, adjustable on metallic surfaces, insuring a perfect gas-tight joint in any position of adjustment.

I claim as my invention:

1. In an adjustable insulated joint a body of insulating material and upper and lower joint members embedded in said body and insulated from each other thereby, said lower member having a depression in its under side, a fixture member located beneath said joint and having a part adapted in size and shape to fit in said depression whereby the position of said fixture member can be adjusted with respect to said joint, and means for maintaining said fixture member in its adjusted position, said body, said upper and lower joint members and said fixture member having central passages therethrough.

2. In an adjustable insulated joint a body of insulating material and upper and lower metallic joint members embedded in said body and insulated from each other thereby, said lower member having a depression in its under side, a fixture member located beneath said joint and having a metallic part adapted in size and shape to fit in said depression, means for adjusting the position of said fixture member with respect to said joint, said body, said upper and lower joint members and said fixture member having central passages therethrough.

3. In an adjustable joint a body of insulating material, upper and lower metallic joint members embedded in said body and insulated from each other thereby, said lower member having a depression in its under side, a metallic fixture member located beneath said lower member and having a part adapted in size and shape to fit in said depression, a flange on said fixture member, adjusting screws through said flange and connecting said fixture member to said joint, said body and upper and lower members having a central passage therethrough, and said fixture member having a central passage communicating with the passage through said body, substantially as described.

THOMAS H. BRADY.

Witnesses:
H. E. HART,
D. I. KREIMENDAHL.